United States Patent [19]
Goetz et al.

[11] 3,727,085
[45] Apr. 10, 1973

[54] ELECTRIC MOTOR WITH FACILITY FOR LIQUID COOLING

[75] Inventors: Peter B. Goetz, Martinsville, N.J.; Wilbert E. Bullert, Woodbridge, both of N.J.

[73] Assignee: General Dynamics Corporation, Avenel, N.J.

[22] Filed: Sept. 30, 1971

[21] Appl. No.: 185,016

[52] U.S. Cl. ................................310/54, 310/58
[51] Int. Cl. ..............................................H02k 9/00
[58] Field of Search...............310/54, 53, 55, 57, 310/58, 86, 87

[56] References Cited

UNITED STATES PATENTS

| | | | |
|---|---|---|---|
| 2,917,644 | 12/1959 | Laffoon | 310/55 |
| 2,891,391 | 6/1959 | Kocher | 310/54 |
| 2,964,659 | 12/1960 | Steele | 310/54 |
| 3,629,627 | 12/1971 | Dafler | 310/54 |
| 3,475,631 | 10/1969 | Stark | 310/54 |
| 3,128,712 | 4/1964 | Sence | 310/86 |
| 3,135,211 | 6/1964 | Pezzillo | 310/86 |
| 2,734,459 | 2/1956 | Zimsky | 310/54 |

Primary Examiner—R. Skudy
Attorney—Martin Lukacher

[57] ABSTRACT

A liquid cooled electric motor is disclosed having a rotor surrounded by a stator and separated from the stator by a gap. A sleeve of insulating non-magnetic material separates the rotor from the stator and divides the motor housing into a stator cavity and a rotor cavity. The stator cavity is filled with a vaporizable refrigerant to a level covering the stator windings of the motor. A porting structure connects the lower portion of the rotor cavity to the stator cavity such that liquid refrigerant fills the rotor cavity to a predetermined level. The refrigerant cools both the rotor and the stator; thereby providing large horsepower output with a minimum motor size.

15 Claims, 5 Drawing Figures

INVENTOR.
PETER B. GOETZ AND
WILLERT E. BULLERT
BY
ATTORNEY

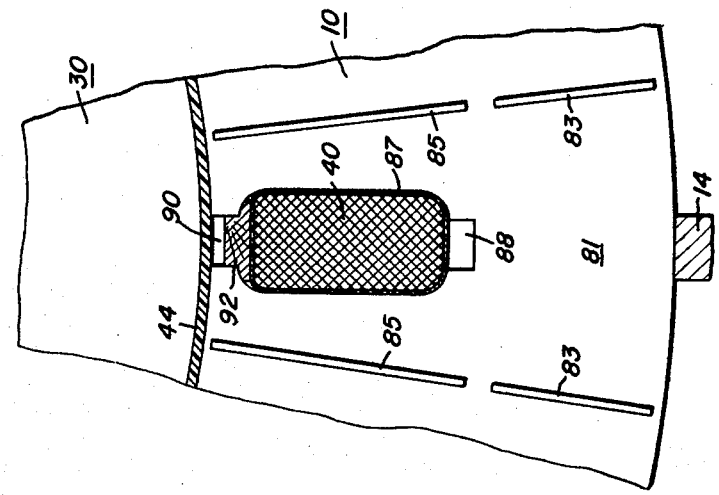
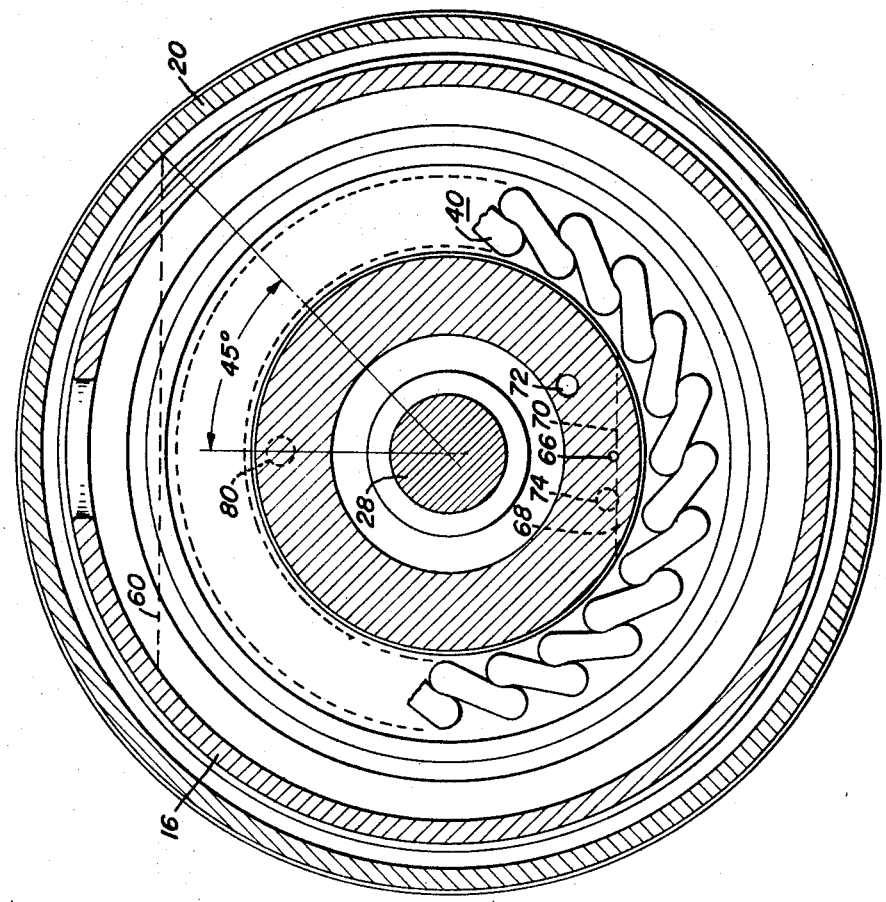

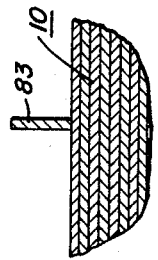
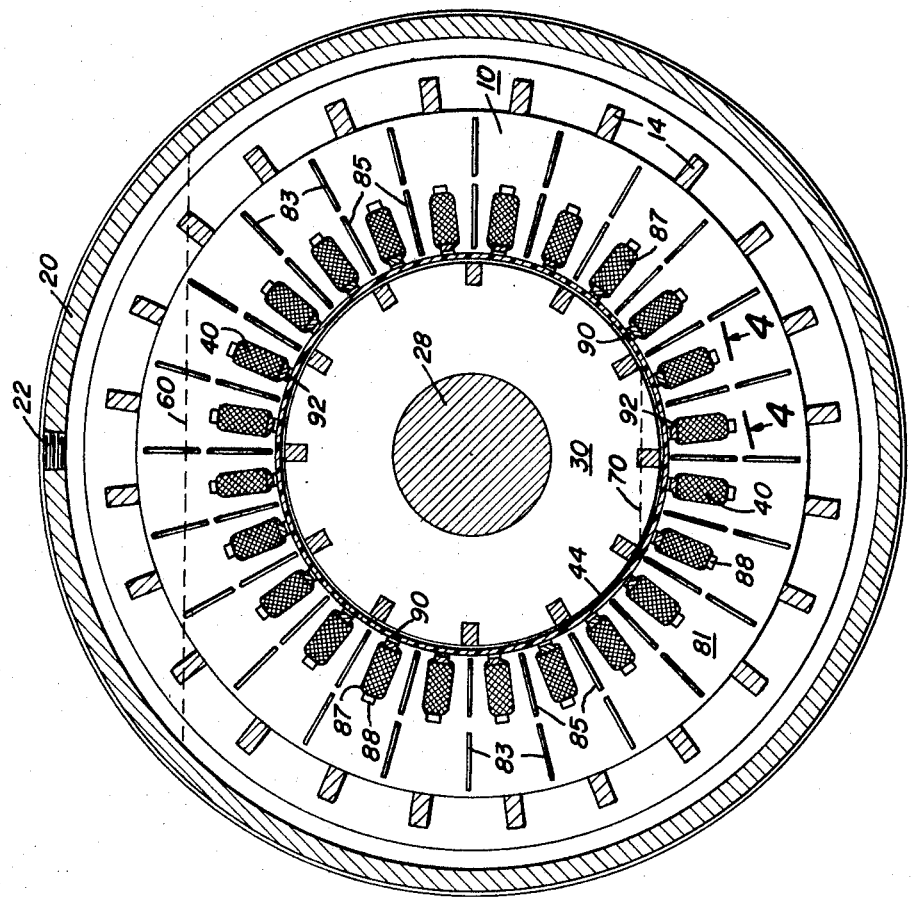

ELECTRIC MOTOR WITH FACILITY FOR LIQUID COOLING

The present invention relates to electric motors and particularly to liquid cooled or hermetic electric motors.

The invention is especially suitable for use in electric motors incorporated in refrigerating systems; such refrigerating systems being especially adopted for use in air-conditioning equipment and industrial process equipment, such for example as water chillers. Features of the invention, however, will also be useful in electrical machinery of various types where efficient operation and/or minimal electrical machinery size is desired.

Various types of liquid cooled electric motors have been suggested in the past. In certain of these liquid cooled motors, a liquid is sprayed upon the motor windings or is injected into the rotor from which it is sprayed under pressure on to the stator windings. Such motors have the drawbacks of causing erosion of the windings and the insulation thereon in the course of motor operation over a period of time.

Other types of cooled motors utilize the vapor of a refrigerant to provide cooling. Refrigerant vapor alone does not have the capability of removing large amounts of heat efficiently from the motor.

Motors incorporating vapor cooling are of larger size than is needed for many applications.

It is an object of the present invention to provide an improved electric motor.

It is another object of the present invention to provide an improved liquid cooled electric motor.

It is a still further object of the present invention to provide an improved motor which is substantially hermetically sealed.

It is a still further object of the present invention to provide an improved liquid cooled electric motor having a larger horsepower for the same motor volume than is presently obtainable with existing liquid cooled electric motors.

It is a still further object of the present invention to provide an improved liquid cooled electric motor which makes efficient use of the cooling capacity of a cooling liquid such as a fluorinated hydrocarbon (such fluorinated hydrocarbons being sold under the trade name "Freon" by Dupont of Wilmington, Delaware).

It is a still further object of the present invention to provide an improved liquid cooled electric motor having flexibility of design whereby electrical characteristics and efficiency of the motor can be optimized.

It is a still further object of the present invention to provide an improved liquid cooled electric motor of a design whereby the desired trade-off between overall efficiency (in terms of tons of cooling capacity per kilowatt hour) as against the power factor and size can readily be obtained.

It is a still further object of the present invention to provide an improved liquid cooled electric motor of simplified design which is readily manufacturable at minimum cost.

It is still another object of the present invention to provide an improved liquid cooled motor without the disadvantages, such as erosion, of spray cooled motor.

Briefly, an electric motor embodying the invention is adapted to be cooled by a liquid such as a vaporizable refrigerant. The motor has a stator, and a rotor mounted for rotation in the stator. The outer periphery of the rotor is spaced from the inner periphery of the stator to define a cylindrical gap there between. A jacket surrounds the stator and may be enclosed by end housings so as to provide a hermetic enclosure for the motor. A cylindrical sleeve, desirably of high temperature, non electrically conductive and non-magnetic material such as fiberglass, extends axially through the gap and separates the housing of the motor into a rotor cavity around the rotor and a stator cavity between the sleeve and the jacket. The stator cavity is filled to a predetermined level, desirably covering the windings on the stator, with the liquid refrigerant. A vent is provided in the upper portion of the jacket to permit the escape of the refrigerant vapor.

In order to cool the rotor, a porting structure can be provided so as to enable liquid refrigerant from the lower region of the stator cavity to enter the rotor cavity. The liquid refrigerant in the rotor cavity covers a segmental area of the rotor cavity including the gap. Thus, as the rotor rotates, the liquid refrigerant cools the rotor structure. Drains may be provided in order to set the level of the refrigerant in the rotor cavity. A venting structure may also be provided so as to communicate the upper regions of the rotor and stator cavities whereby vaporized refrigerant in the rotor cavity can escape together with vaporized refrigerant in the stator cavity. The venting passages may also be provided in the stator so as to afford radial and axial vents whereby to establish the flow of liquid through the stator and to permit the escape of bubbles of vaporized refrigerant which may be formed in the process of cooling the stator.

The foregoing and other objects and advantages of the present invention will be more fully understood from a reading of the following description when taken in connection with the accompanying drawings in which:

FIG. 2 is a sectional view of the motor shown in FIG. 1, the section being taken along the line 2—2 in FIG. 1;

FIG. 3 is another sectional view of the motor shown in FIG. 1, the section being taken along the line 3—3 in FIG. 1;

FIG. 4 is an enlarged fragmentary sectional view, the section being taken along the line 4—4 in FIG. 3; and FIG. 5 is an enlarged fragmentary sectional view, showing in detail a portion of the stator winding in on of the slots.

Figure 1:
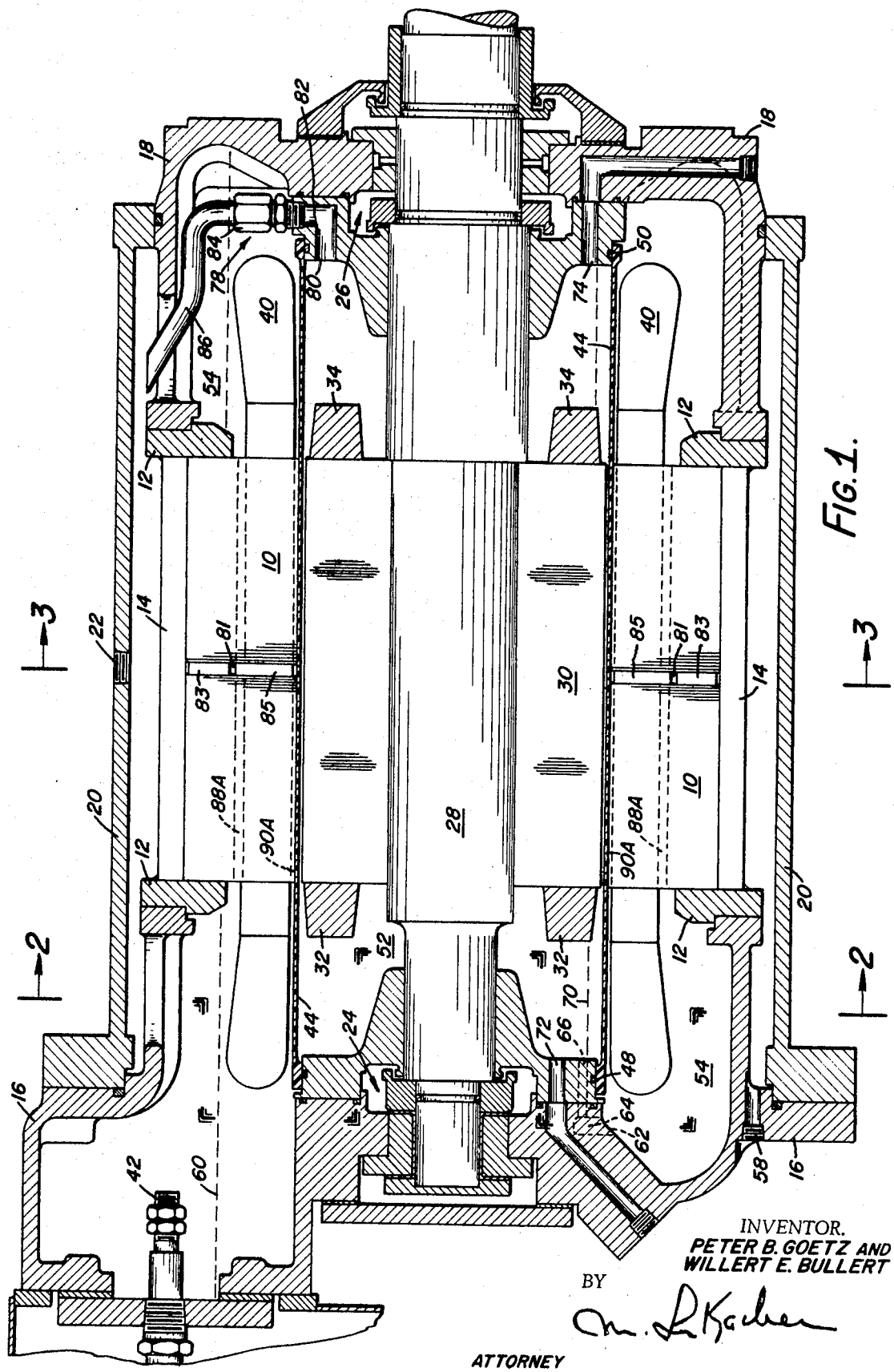
FIG. 1 is a vertical sectional view of an electric motor embodying the invention.

Referring to FIG. 1, there is shown an electric motor having a stator 10 made up of a large number of laminations of disc-like configuration. The laminations are assembled together by end rings 12 and bars 14; the bars 14 being spaced from each other around the outer periphery of the laminations. End housings 16 and 18 are fastened to the end rings 12. The jacket 20 surrounds the stator and is fastened at the ends to the end rings 16 and 18 so as to provide a hermetically sealed housing for the motor. An exhaust port for vaporized refrigerant, the port being indicated at 22, is provided in the upper side wall of the jacket 20.

The housing ends 18 and 16 also provide seats in which bearings 24 and 26 for the shaft 28 of the motor are located.

A rotor 30 is keyed or otherwise secured to the shaft 28. The rotor 30 is made up of a stack of lamination discs; the discs may be slotted and have slots aligned axially of the rotor. These slots are filled with conductive material such as aluminum bars. The bars are interconnected at each end by rotor end rings 32 and 34 so as to provide a squirrel cage rotor.

The stator 10 also has, as best may be observed in FIG. 3, slots in each of its laminations in which stator windings 40 may be located. These windings may be interconnected in a conventional manner to provide a single or multiple phase stator winding; the connections being brought out to terminals, one of which 42 is shown in FIG. 1.

The outer periphery of the rotor 30 and the inner periphery of the stator 10 are separated by a cylindrical air gap. A sleeve of insulating material 44 which is cylindrical in form extends through the gap axially. This sleeve is desirably made of high temperature non-conductive and non-magnetic material. A wound fiberglass material which is impregnated by a high temperature epoxy resin as a binding agent has been found to be suitable.

The opposite ends of the sleeve 44 extend over the housing ends 16 and 18. O rings 48 and 50 in the housing ends provide a seal for the sleeve 44. Accordingly, the sleeve 44 divides the motor housing into a rotor cavity surrounding the rotor, the rotor cavity being indicated by the reference numeral 52, and a stator cavity 54 between the jacket 20 and the sleeve 44.

Referring now also to FIG. 2 as well as FIG. 1, an inlet of porting structure 58 is provided in the lower left-hand corner of the housing end 16. Liquid refrigerant such as Freon from the condenser of a refrigerating system, as for example, a refrigerating system which has a compressor operated by the motor shaft 28, is provided. This porting structure is an opening 58 through the housing end 16 which may be threaded for a hose or pipe connection from the refrigerating system.

A refrigerating system which may include a condenser driven by the shaft 28 of the motor may provide the liquid refrigerant which will be available from the condenser of the refrigerating system. The refrigerant fills the stator cavity 54 to a predetermined level. The level is shown by the horizontal line 60 in FIG. 2. This line is defined between the points of intersection of lines from the axis of the rotor shaft 28 which are angles of 45° to the horizontal center line and the inner periphery of the jacket 20.

In order to establish this predetermined refrigerant level, the motor may be located such that a tank containing all or part of the output of the condenser of the refrigerating system has its upper end in line with the desired refrigerant level 60. Alternatively, the refrigerating system may include control valves whereby the height of the refrigerant in the condensing tank of the system may be held at the level necessary to provide the desired stator cavity refrigerant level 60.

It will be noted that the refrigerant level 60 can be set high enough to cover or to be in contact with all of the stator coils or windings 40.

In order to provide cooling for the rotor 30, a porting structure 62 is provided in the housing end 16 so as to afford communication between liquid filled stator cavity 54 and the rotor cavity 52. This porting structure includes a vertical or riser opening 64 and the horizontal opening 66 into the lower region of the rotor cavity 52.

A refrigerant level is established in the rotor cavity sufficient to cover a predetermined level of the rotor 30. As shown in FIG. 2, a segmental portion 68 of the rotor cavity 52 is filled to a predetermined level 70 in the rotor cavity 52. This level 70 is sufficiently high to cover a portion of the rotor end rings 32 and 34 so as to bring the liquid refrigerant into cooling contact with the current carrying bars of the rotor 30.

The level 70 is set by drain or overflow ports 72 in the left housing end 16 and 74 in the right housing end 18. The overflow drain 74 establishes the level 70 while the overflow drain 72 at the left housing end 16 insures against overfill due to any possible backup at the lefthand end of the rotor 30 as fluid enters the rotor cavity 52 through the porting structure 62.

In order to vent any vaporized refrigerant, a vent structure 78 is provided which communicates the upper region of the rotor cavity 52 with the upper region of the stator cavity 54. This vent structure 78 includes a horizontal opening 80 and a vertical riser 82 which is connected by way of a coupling 84 to a pipe 86. The pipe 86 terminates just below the upper wall of the jacket 20. Vaporized refrigerant from the stator cavity and vaporized refrigerant from the rotor cavity are thus both vented through the outlet port 22. The outlet port 22 may receive a hose coupling. The hose in this coupling is connected to the compressor of the refrigerating system in which the motor operates.

Internal construction of the stator 30 is shown in greater detail in FIGS. 3, 4 and 5. As noted above, the stator is made up of a stack of laminations. One or more radial vents for the flow of liquid refrigerant and the passage of any vaporized refrigerant bubbles is provided. This vent is indicated at 81 in FIG. 1. The vent is provided by spacer bars 83 and 85, a plurality of which extend radially in the vent passage 81. The bars may be of soft iron initially welded to one of the laminations. Thus, when the stack of laminations is assembled, the vent 81 is formed. It will be noted that the bars 83 and 85 are spaced laterally from each other; therefore providing passages for the flow of the liquid refrigerant both laterally or circumferentially as well as radially through the vent 81. While one vent 81 is shown, a plurality of such vents may be provided; the number dependent upon the length of the stator in an axial direction.

Each of the laminations includes a plurality of winding slots 87. These slots include radial extensions 88 and 90; the extension 88 being directed to the outer periphery of the laminations while the extension 90 is directed toward the inner periphery thereof. These slots extensions 88 and 90 form axial slots 88A and 90A when the laminations are stacked. These axial slots 88A and 90A communicate the ends of the stator 10 with the vent 81. Accordingly, liquid refrigerant and bubbles can pass both radially and circumferentially through vent 81 and outwardly in an axial direction through the axial slots 88A and 90A. Slot sticks 92 are wedged into the slots 90 and extend partially into the winding slots 87 and hold the windings in each slot in place (see FIG. 5).

From the foregoing description, it will be apparent there has been provided an improved liquid cooled electric motor. While an exemplary embodiment of the motor as provided in the invention has been shown, it will be appreciated that variations and modifications of the herein described motor will become apparent to those skilled in the art. Accordingly, the foregoing description should be taken merely as illustrative and not in any limiting sense.

What is claimed is:

1. An electric motor adapted to be cooled by a liquid which comprises
   a. a stator,
   b. a rotor mounted for rotation in the stator, the outer periphery of the rotor being spaced from the inner periphery of the stator to define a cylindrical gap there between,
   c. a housing including a jacket surrounding said stator,
   d. a cylindrical sleeve extending axially of said gap and defining a rotor cavity around said rotor and a stator cavity between said sleeve and said jacket,
   e. means for filling said stator cavity to a first predetermined level with said liquid, and
   f. means in said housing communicating the portion of said stator cavity filled with said liquid with said rotor cavity for filling said rotor cavity with said liquid to a second predetermined level lower than said first level.

2. The invention as set forth in claim 1 wherein said liquid is a vaporized refrigerant of the class including fluorinated hydrocarbons.

3. The invention as set forth in claim 2 wherein said stator includes means for providing a radial vent therein, said vent extending from the outer periphery of said stator to the inner periphery thereof for providing a path for flow of said liquid and bubbles of the vapor of said liquid, said vent extending above said first predetermined level.

4. The invention as set forth in claim 3 wherein said vent providing means includes a plurality of radially extending bars disposed in the same plane.

5. The invention as set forth in claim 4 wherein said bars have a plurality of parts spaced radially from each other to provide lateral flow paths through said bars via the spaces therebetween.

6. The invention as set forth in claim 4 wherein said stator has a plurality of axial openings extending into said vents from the ends of said stator.

7. The invention as set forth in claim 4 wherein said stator has a plurality of axially extending slots for receiving windings, windings contained in said slots, said slots also having a section extending radially beyond the portion of said slots which contain said windings, said radial sections defining an axial slot communicating the ends of said stator with said vents.

8. The invention as set forth in claim 7 wherein said slots each have a pair of said sections, one extending toward the inner periphery of said stator and the other toward the outer periphery thereof.

9. The invention as set forth in claim 1 wherein said second predetermined level covers a sector of said rotor less than 180° around the lower periphery of said rotor.

10. The invention as set forth in claim 9 wherein said sector is less than 90° centered about the vertical center line of said rotor.

11. The invention as set forth in claim 1 wherein said means in said housing communicating said rotor and stator cavities includes a porting structure providing communication between said stator cavity and said rotor cavity.

12. The invention as set forth in claim 11 wherein said motor has end housings and said porting structure includes an opening in one of said end housings communicating the adjacent portions of said stator cavity and said rotor cavity.

13. The invention as set forth in claim 12 including a venting structure for vapors of said liquid, said venting structure communicating between the upper regions of both said stator cavity and said rotor cavity which lie above said first and second predetermined levels respectively.

14. The invention as set forth in claim 12 wherein at least one of said end housings has at least one drain opening disposed above the level of said operating structure opening for establishing the second predetermined level of said liquid in said rotor cavity.

15. The invention as set forth in claim 14 wherein each of said end housings has a separate one of said drain openings therein, the one of said end housings having said porting structure opening having its drain opening above the level of the drain opening in the other of said end housings.

* * * * *